US007693793B2

(12) United States Patent
Schmidt

(10) Patent No.: US 7,693,793 B2
(45) Date of Patent: Apr. 6, 2010

(54) MANAGEMENT OF INTRA-DAY INTEREST CALCULATIONS FOR BANK ACCOUNTS

(75) Inventor: Diane Simona Bettina Schmidt, Walldorf (DE)

(73) Assignee: SAP AG, Walldorf (DE)

( * ) Notice: Subject to any disclaimer, the term of this patent is extended or adjusted under 35 U.S.C. 154(b) by 1171 days.

(21) Appl. No.: 10/673,442

(22) Filed: Sep. 30, 2003

(65) Prior Publication Data
US 2005/0080694 A1    Apr. 14, 2005

(51) Int. Cl.
*G06Q 40/00*    (2006.01)
*G06Q 10/00*    (2006.01)

(52) U.S. Cl. .......................................... 705/42; 705/35
(58) Field of Classification Search .................... 705/35
See application file for complete search history.

(56) References Cited

U.S. PATENT DOCUMENTS

| 6,021,397 | A |   | 2/2000 | Jones et al. | |
|---|---|---|---|---|---|
| 6,038,550 | A | * | 3/2000 | Rosenwald | 705/35 |
| 6,836,764 | B1 | * | 12/2004 | Hucal | 705/40 |
| 7,117,172 | B1 | * | 10/2006 | Black | 705/35 |
| 7,146,336 | B2 | * | 12/2006 | Olsen et al. | 705/37 |
| 7,499,884 | B2 | * | 3/2009 | Dueppers | 705/37 |
| 2001/0042785 | A1 |   | 11/2001 | Walker et al. | |
| 2001/0056391 | A1 | * | 12/2001 | Schultz | 705/36 |
| 2003/0065594 | A1 | * | 4/2003 | Murphy | 705/35 |
| 2003/0120566 | A1 | * | 6/2003 | Lipschutz et al. | 705/30 |
| 2003/0225692 | A1 | * | 12/2003 | Bosch et al. | 705/42 |
| 2004/0117302 | A1 |   | 6/2004 | Weichert et al. | |
| 2004/0177036 | A1 | * | 9/2004 | Nutahara et al. | 705/39 |

OTHER PUBLICATIONS

"Further Evidence on the Corporate Use of Derivatives in Australia: The Case of Foreign Currency and Interest Rate Instruments", Hoa Nguyen, Journal of Management. Sydney: Dec. 2003. vol. 28, Iss. 3; p. 307, 11 pgs.*
"Your Money; Computer Interest Gains", Sloane, Leonard, New York Times., New York, NY.: Jul. 23, 1983. p. 1:30.*
"How Italy shrank its deficit", Jules Evans. EuroMoney. London: Dec. 2001., Iss. 392; p. 22.*
Further Evidence on the Corporate Use of Derivatives in Australia . . . ;Nguyen et al., Australian Journal of Mgmt., Sydney, Dec. 2003, vol. 28, Iss 3, p. 307.

* cited by examiner

*Primary Examiner*—Hani Kazimi
*Assistant Examiner*—Mohammad Z Shaikh
(74) *Attorney, Agent, or Firm*—Kenyon & Kenyon LLP

(57) ABSTRACT

Embodiments of the present invention relate to a computer-implemented method and system for managing intra-day interest calculation on a bank account. The embodiments provide for control of and support for interest calculations that, instead of being based on daily end-of-day account balances, are based on a plurality of net account balances as determined for a plurality of points in time within a day.

13 Claims, 10 Drawing Sheets

FIG.3

| SUN | MON | TUE | WED | THU | FRI | SAT |
|---|---|---|---|---|---|---|
| 1 / 0 | 2 / 1 | 3 / 1 | 4 / 1 | 5 / 1 | 6 / 1 | 7 / 0 |
| 8 / 0 | 9 / 1 | 10 / 1 | 11 / 3 | 12 / 2 | 13 / 1 | 14 / 0 |
| 15 / 0 | 16 / 1 | 17 / 1 | 18 / 1 | 19 / 1 | 20 / 6 | 21 / 0 |
| 22 / 0 | 23 / 1 | 24 / 1 | 25 / 1 | 26 / 1 | 27 / 5 | 28 / 0 |
| 29 / 0 | 30 / 4 | | | | | |

INTEREST DAY TYPES.

0-WEEKEND

1-WORKDAY

2-PUBLIC HOLIDAY

3-DAY BEFORE PUBLIC HOLIDAY

4-LAST DAY OF MONTH

5-DAY BEFORE LAST DAY OF MONTH

6-OPTION EXPIRATION DAY

MANAGEMENT OF INTRA-DAY INTEREST CALCULATIONS FOR BANK ACCOUNTS

FIELD OF THE INVENTION

Embodiments of the present invention relate to computers and computer software, and more specifically to a computer-implemented method and system for management of intra-day interest calculations for bank accounts.

BACKGROUND INFORMATION

When interest is calculated on money in a bank account, the way the calculation is performed is typically based at least partly on the contractual terms applicable to the account. For example, in typical personal bank accounts, interest calculations by contract are based on the account balance at the end of a business day. More specifically, for example, to accrue or charge interest to an account and produce a monthly account statement, the daily recorded end-of-day balances of the account over a period of, say, thirty days may be used to calculate interest. Because the only relevant time interval in such a calculation is the business day, typically only the date (as opposed to more precise time information) of a transaction which alters the account balance is recorded and used in the interest calculation.

However, developments in the business world have led to an increasing demand for greater precision in the calculation of interest. For example, because data processing technology is currently able to transfer large amounts of money between accounts in "real time"—that is, in practical terms, almost instantaneously—often the balance in an account can fluctuate dramatically within the course of a single business day. When interest is only calculated based on a net account balance at the end of the business day, such fluctuations may not be accurately registered in terms of potential corresponding interest charges, which may mean that banks offering such real-time transfer services lose out on large interest revenues.

For example, suppose 10,000 currency units are withdrawn from a bank account at 8:00 A.M., the beginning of the bank's business day, leaving a negative balance for the account of −10,000 currency units. Then, suppose the 10,000 currency units are re-deposited in the account at 4:00 P.M., the end of the bank's business day, leaving a net balance on the account for the day of 0 (zero) currency units. If an interest calculation is only performed based on the net account balance at the end of the day, i.e., on an account balance of zero, the bank has, in effect, lent the withdrawer the 10,000 currency units for the day free of interest.

Banks may offer real-time services, for example, in connection with a known "continuous linked settlement" (CLS) system. The CLS system links member banks internationally and enables real-time transactions. In particular, the CLS system is favored because it reduces settlement risk associated with large foreign currency transactions. Banks that are members of the CLS system may offer real-time transaction services to non-member banks. Such member banks have recognized that these real-time services should have corresponding interest calculation that reflects their possibly rapidly fluctuating nature, and may form contracts with non-member banks accordingly. That is, as a condition of providing real-time transaction services, banks providing the services may contract with banks receiving the services that the banks receiving the services will pay interest based on more precise calculations than the traditional calculations based on end-of-day balances.

In view of the foregoing considerations, there is a need for a method and system for managing bank accounts to provide more precise interest calculations.

SUMMARY OF THE INVENTION

Embodiments of the present invention relate to managing bank accounts wherein interest is calculated for the accounts on an "intra-day" basis. Intra-day means that, as opposed to being based on daily end-of-day account balances, interest calculations are instead based on a plurality of net account balances as determined for a plurality of points in time within the span of a day. According to the embodiments, intra-day interest account management systems may provide for the setting of balance determination times, where the balance determination times correspond to a plurality of points in time within the span of a day. The balance determination times could define an interval as small as, for example, a single second. Net account balances at each of the balance determination times may be determined and passed to interest calculation logic that performs interest calculations based on the net balances at each of the balance determination times. Further, according to embodiments, different interest rates could be determined for different balance determination times and provided to the interest calculation logic for use in the intra-day interest calculation, where the interest rates may vary based on such factors as the time of day and the calendar day of the week or month. Because calculating the net balances at the balance determination times is able to capture rapid fluctuations in an account balance, and because the interest rates applied in the calculations can be finely tailored, embodiments of the invention may enable greater precision in the calculation of interest as compared to known arrangements.

BRIEF DESCRIPTION OF THE DRAWINGS

FIG. 3 shows an example of a display format according to embodiments of the invention;

FIG. 5 shows an example of an "interest calendar" according to embodiments of the invention;

FIG. 6 shows another example of a display format according to embodiments of the invention;

DETAILED DESCRIPTION

Figure 1:
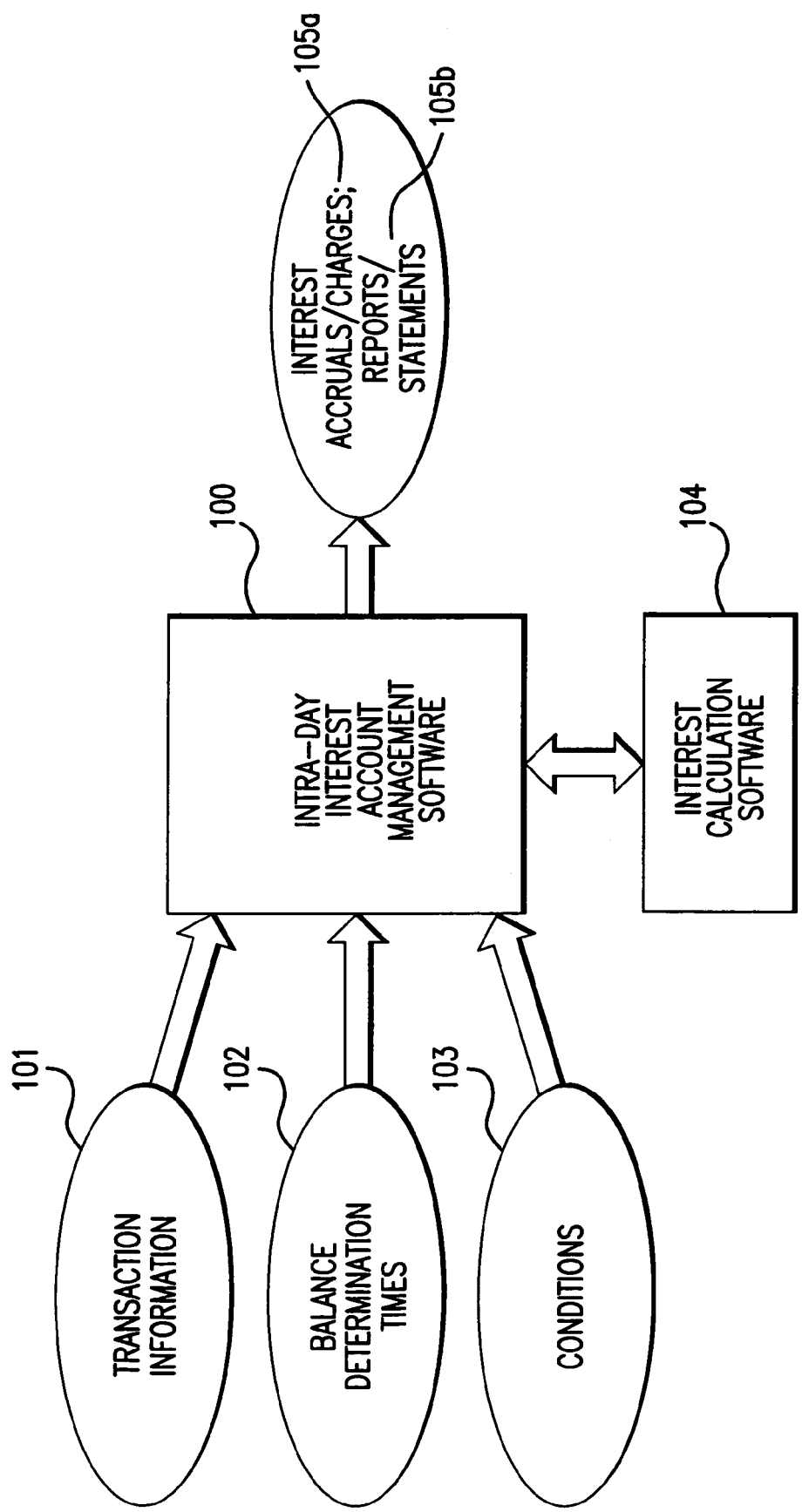
FIG. 1 shows elements of the invention according to embodiments.

Embodiments of the present invention relate to creating and managing bank accounts for which interest is calculated on an intra-day basis. FIG. 1 shows elements of the present invention according to embodiments. The embodiments may comprise intra-day interest account management software 100. The intra-day interest account management software 100 may be used to create a new bank account, or modify an existing bank account, to receive intra-day interest calculation according to desired parameters. The intra-day interest account management software 100 may receive, as input, transaction information 101 (a transfer of money between accounts, or a withdrawal from or deposit to an account may be referred to herein as a "transaction"), balance determination times 102, and conditions 103 applicable to the intra-day interest calculation. Based on values received from the intra-day interest account management software 100, intra-day interest calculation software 104 may calculate interest for a specific account and a specific period of time. As a result of operations by the intra-day interest calculation software 104, an interest accrual or interest charge 105a may be credited/debited to the account, and a statement or report 105b on interest accruals/charges may be produced by the interest account management software 100.

More specifically, intra-day interest calculation and reporting may be performed at predetermined account "settlement" times. Settlement is a periodic operation in which interest and fees are calculated and reported to an account holder; for example, the monthly statement received by most holders of personal bank accounts is produced by settlement activities. However, settlement need not be performed only for periods of a month; other, shorter or longer settlement periods are possible.

Figure 2:
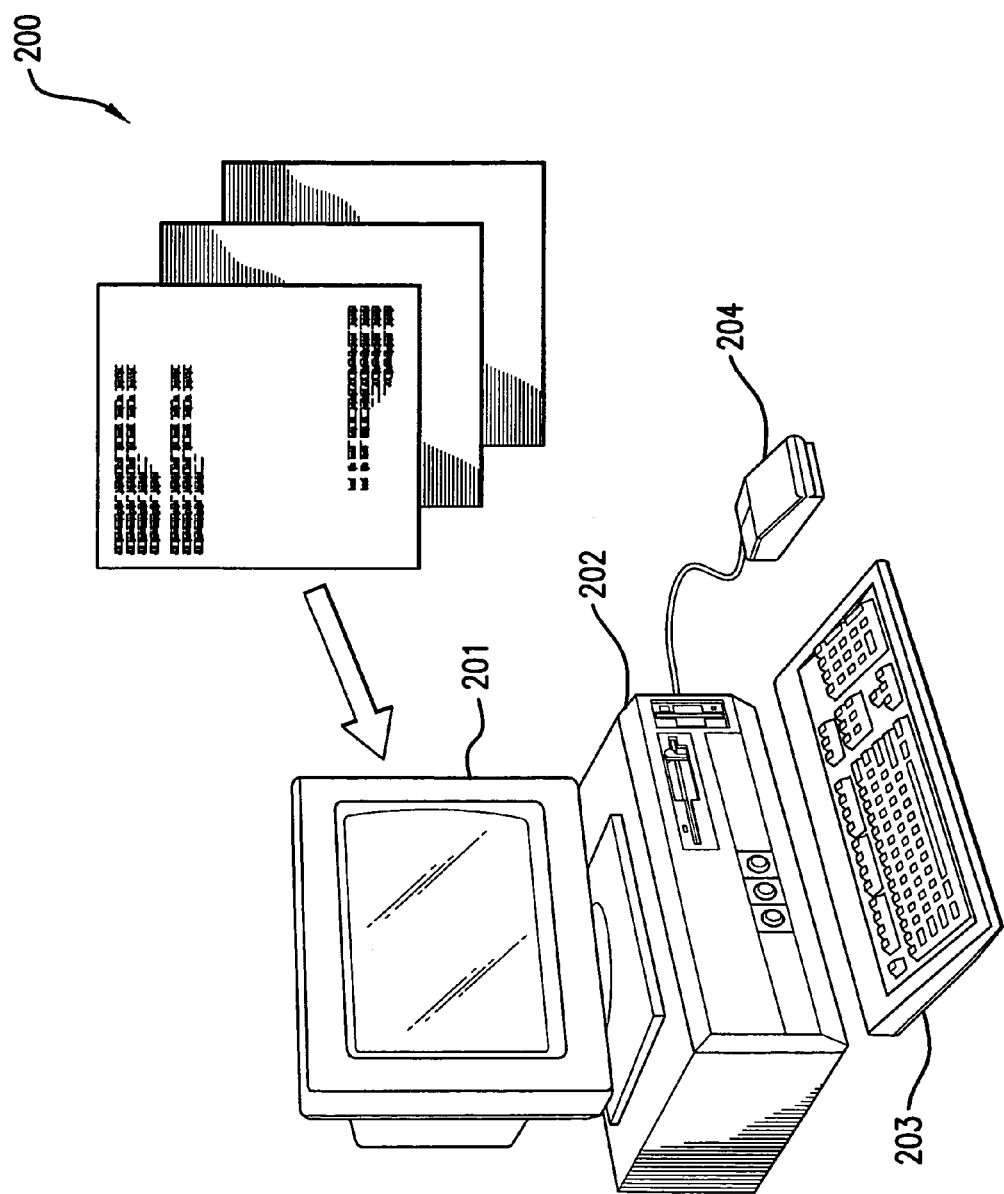
FIG. 2 illustrates a user interface according to embodiments of the invention.

Referring to FIG. 2, the intra-day interest account management software 100 may comprise software for implementing a graphical user (GUI) interface including a plurality of displays 200. The displays, for example, could be presented on a display device 201 coupled to a computer 202 and input devices such as a keyboard 203 and a mouse 204. The plurality of displays could present a plurality of fields for entry and display of information relating to intra-day interest account management operations. Information entered into the fields could be stored in databases on some form of computer-readable medium such as disk or memory, for access and retrieval when needed, for example, to perform a particular operation relating to an account configured to receive intra-day interest calculation.

For example, the fields could provide for the entry or display of transaction information 101. Transaction information 101 could include such things as an account identifier, an indicator or flag that the identified account is to receive intra-day interest calculation, a "payment item," a "payment order," a "value date" and a "value time." A payment item is a transaction to a single account, e.g., a deposit of $1000 to account XYZ. A payment order is a transaction from one account to another, e.g. a withdrawal of $1000 from account ABC that is deposited in account XYZ, resulting in two payment items. A value date is a date on which a payment item is to be taken into account for interest calculation, and may be used for settlement of an account at the end of a designated period (e.g., a month), when the bank calculates interest and fees for that period. Every payment item in the account may have associated with it a "posting date" (the date when the payment item is entered or recorded), a value date (the posting date and the value date are not necessarily the same) and a value time. The value time is the time when the payment item is taken into account for interest calculation. The value time may, for example, have the format hh:mm:ss (hours:minutes:seconds); that is, the value time may record the time of a transaction with accuracy to the second. It may be noted that in traditional end-of-day interest calculations as described earlier, accuracy to this level would be superfluous.

Figure 3:
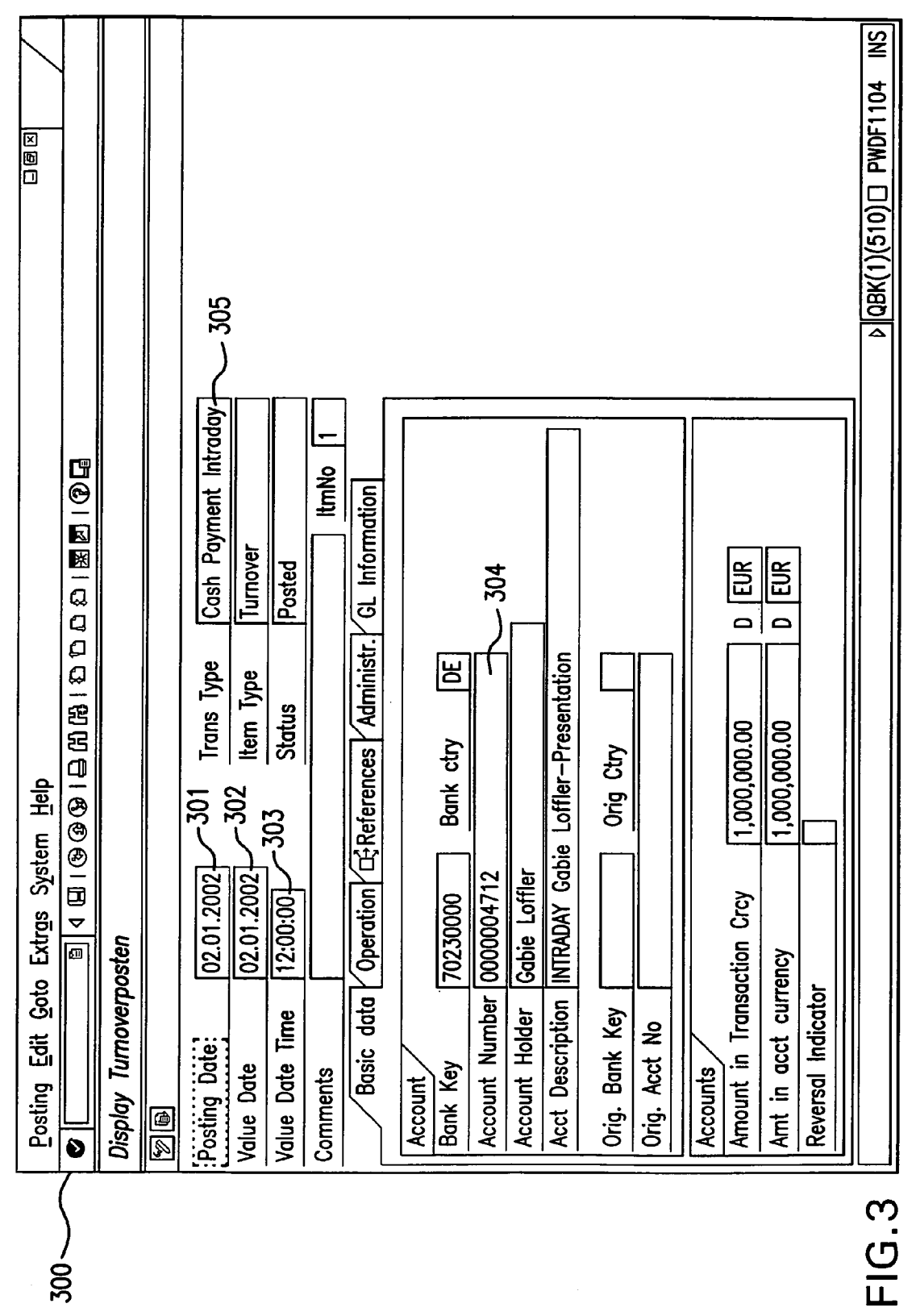

For purposes of illustrative example only, FIG. 3 shows one possible display format 300 of the displays 200 that could be generated by the intra-day interest account management software 100. The display format may include, for example, an input/display field 301 for entering/displaying a posting date, an input/display field 302 for entering/displaying a value date, an input/display field 303 for entering/displaying a value time, an input/display field 303 for entering/displaying an account identifier, and an input/display field 305 for entering/displaying a payment item description, where in the example shown, the payment item is a debit from the account (a cash payment).

Further, the displays 200 of the intra-day interest account management software could include fields for assigning a "balance time type" to an account for use when the account is settled. Embodiments of the invention may include a plurality of balance time types, each corresponding to particular groupings or distributions of balance determination times 102. A given distribution of balance determination times may correspond to a plurality of points in time within the span of a day. Net balances at respective balance determination times may be used in an interest calculation. The balance determination times could be designated to define, for example, hour-long intervals, but other balance determination times defining smaller or larger intervals are possible. For example, balance determination times could define an interval as short as a single minute or a single second.

Figure 4:
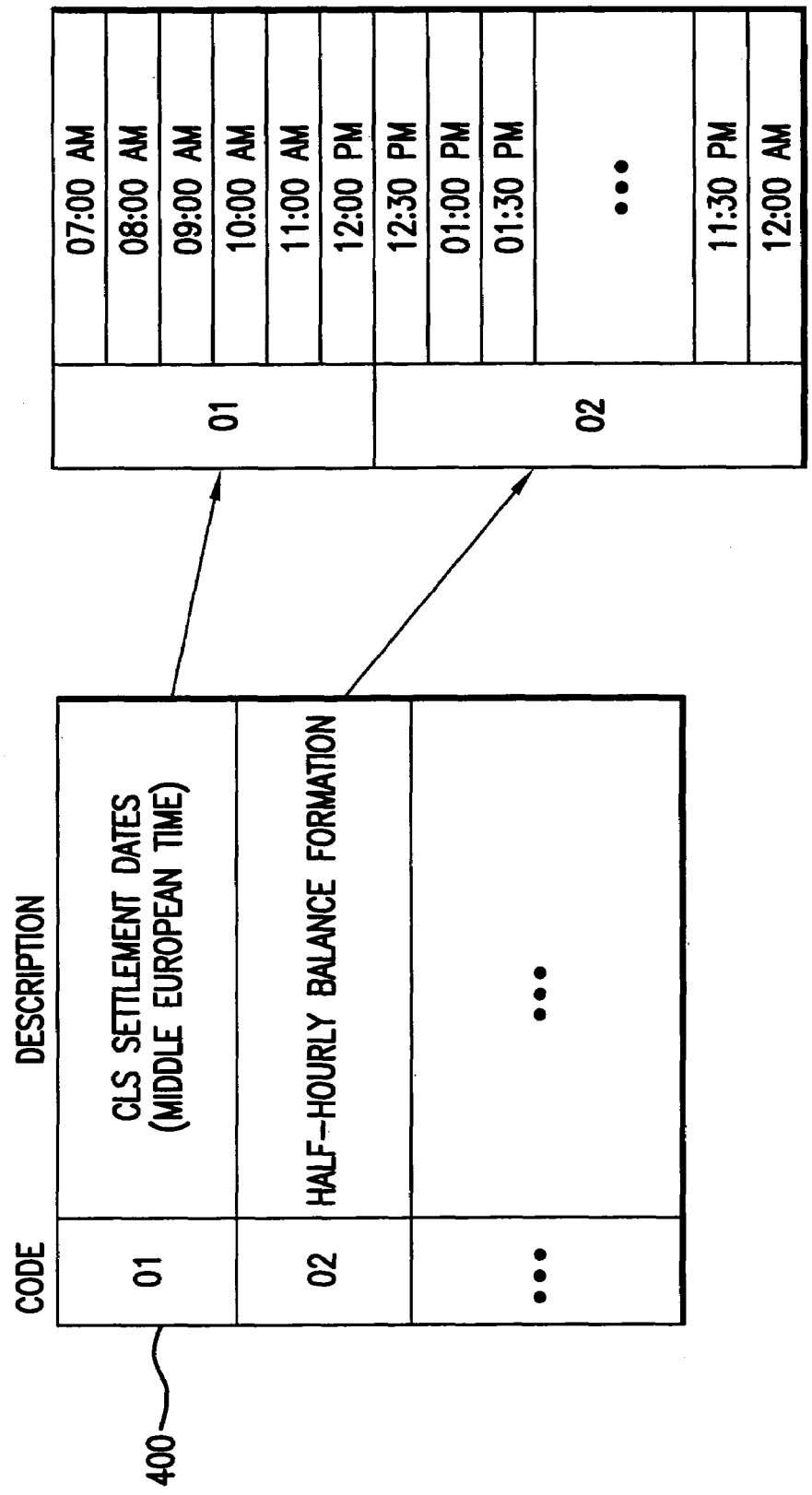
FIG. 4 shows examples of intra-day "balance time types" according to embodiments of the invention.

FIG. 4 shows an illustrative example. In FIG. 4, a table 400 shows a group of codes corresponding to different balance time types, and their descriptions. For example, code "01" designates a balance time type wherein balance determination times are based on the CLS system, and define hourly intervals between 7:00 AM and 12:00 PM (noon). Code "02" designates a balance time type wherein balance determination times are set at half-hour intervals between 12:00 PM (noon) and 12:00 AM (midnight). Thus, FIG. 4 further illustrates that, according to embodiments of the invention, the balance determination times could be changed from one block of time to another by, for example, assigning different balance time types to different blocks of time. Balance determination times need not occur at hourly intervals or half-hourly intervals; any arbitrary time interval is possible. A per-second interval for balance determination could be a default, for example, if no other specific time interval for balance determination is specified.

In view of the foregoing, it may be appreciated that the balance determination times may be adjusted in accordance with the amount of activity shown in an account. For example, if at account settlement it is observed that there has been relatively frequent fluctuation in an account balance, the balance determination times could be adjusted to define relatively short intervals of time. If, on the other hand, it is observed that an account has been relatively inactive, the balance determination times could be adjusted to define relatively long intervals of time. It may be useful to adjust the balance determination times as described, for example, to obtain meaningful results from the interest calculation. For example, because an interest calculation typically depends at least in part on the length of time that a particular amount is present in (or absent from) an account, if the balance determination times are too close together or too far apart, the corresponding interest calculations may not produce meaningful results.

The intra-day interest account management software 100 may further be used to define, for example via fields of displays generated by the intra-day interest account management software 100, a plurality of conditions 103 relating to how interest is to be calculated for a given interval of time. More specifically, the conditions could determine the interest rate to be applied to a given account balance at a particular balance determination time in an intra-day interest calculation, based on such factors as the time of day, the calendar day of the week or month, a variable reference interest rate, and other things. According to embodiments, determination of the conditions may involve consulting previously-set databases which contain, for example, interest rate schedules that specify what interest rate should be applied, for what kind of balance (credit or debit), at what time of day, on a given day. In particular, an "interest calendar," previously generated and stored, may be referred to. The interest calendar may comprise a plurality of differing "interest day types" which each have corresponding differing interest rates. Examples of interest day types include working days, public holidays in a particular country, the last day of the month, the last working day before the last day of the month, an "option expiration" day, a public holiday in the relevant currency's country of issue, and a general public holiday (e.g. Easter and Christmas). An "option expiration" interest day type is an example of a designation of an interest day type to reflect an event in the financial markets. For example, on the third Friday of the third month of each quarter, index futures and options on the Eurex options and futures exchange on the German Stock Exchange (DAX) expire. Such financial market events may call for interest to be calculated differently on the days when they occur.

FIG. 5 shows an example of an interest day calendar 500 corresponding to one possible assignment of interest day types to an arbitrary month. Interest day calendar 500 represents data, which could be stored digitally, retrieved and changed as desired, for example via fields of displays 200 of a user interface implemented by the intra-day interest account management software 100. In the example of FIG. 5, interest day type code "0" has been assigned to most weekend days, and interest day type code "1" has been assigned to most of the working days. Simply for purposes of illustration, day 12 of the month has been designated to be a public holiday, and accordingly is assigned the interest day type code 2; therefore, day 11 is assigned the interest day type code 3. Again, simply for illustration, it is assumed that the month is the third month of the quarter; thus interest day type code 6, representing the financial event of an option expiration day, has been assigned to day 20. Days 27 and 30 have been assigned the interest day type codes 5 and 4, corresponding to the day before the last working day of the month, and the last working day of the month, respectively.

Figure 6:
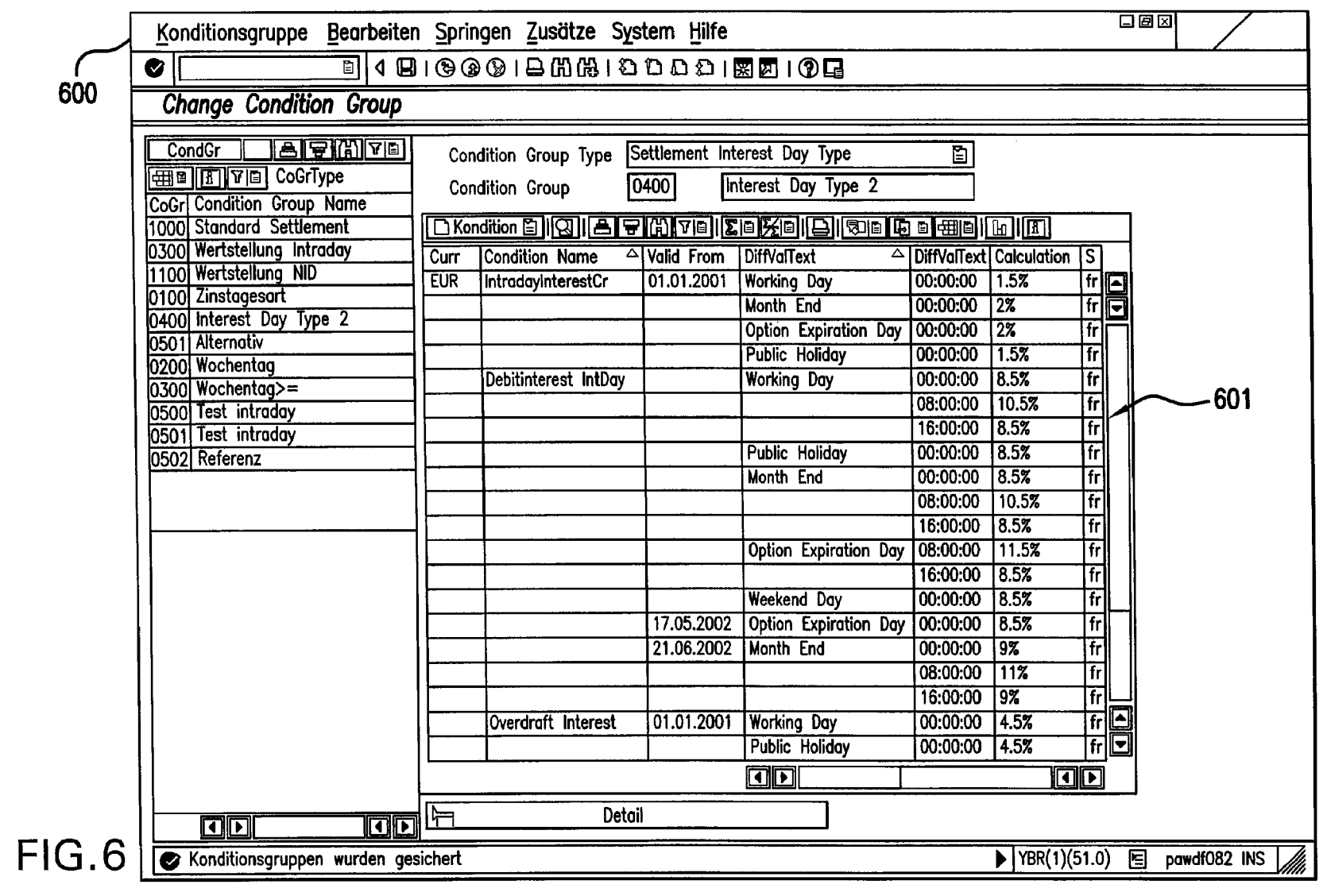

Different interest day types may be associated with respective different interest rates. Further, according to embodiments of the invention, conditions affecting a calculation of interest may be arbitrarily grouped and classified, and selectively applied as desired. FIG. 6 shows an example of a display 600 showing a mapping 601 of different interest rates to various interest day types. The mapping 601 is separated into different condition sets, each with its own arbitrary label or designation: i.e., there is an "IntradayInterestCr" set of conditions (which could represent, for example, conditions relating to an interest rate or rates for credit balances), a "DebitInterestIntDay" set of conditions "(which could represent, for example, conditions relating to an interest rate or rates for debit balances), and an "Overdraft Interest" set of conditions. Each set of conditions assigns interest rates to interest day types differently. For example, the "IntradayInterestCr" set of conditions assigns an interest rate of 1.5% to a working day interest day type, an interest rate of 2% to a month end interest day type, and so on. The "DebitInterestIntDay" set of conditions breaks down applicable interest rates still further, according to time of day. For example, under the "DebitInterestIntDay" set of conditions, for a working day interest day type, the interest rate is 8.5% between midnight (00:00:00) and 8:00 AM (08:00:00), 10.5% between 8:00 AM and 4:00 PM (16:00:00), and 8.5% again between 4:00 and midnight. Condition sets as shown in FIG. 6 could be stored digitally, retrieved and changed as desired, for example via a user interface of the intra-day interest account management software 100.

Based on values set by the intra-day interest account management software 100, the intra-day interest calculation software 104 may perform corresponding operations. More specifically, the intra-day interest calculation software 104 may calculate interest based on account balances netted at the specified balance determination times. The calculations of the intra-day interest calculation software 104 may use interest rates as determined by applicable conditions 103. The interest calculations may be performed at a predetermined settlement time, for example at month's end, when interest and fees need to be reported to account holders. However, settlement need not be performed only for periods of a month; other, shorter or longer settlement periods are possible. Results of operations by the intra-day interest calculation software 104 may cause an interest charge or accrual to be posted to an account and be reported, for example, in an account statement generated by the interest account management software 100, or otherwise recorded or documented. Reported results could show, for example, a start and end time of a period of intra-day interest calculation, and per-interval interest accruals/charges.

Figure 7:
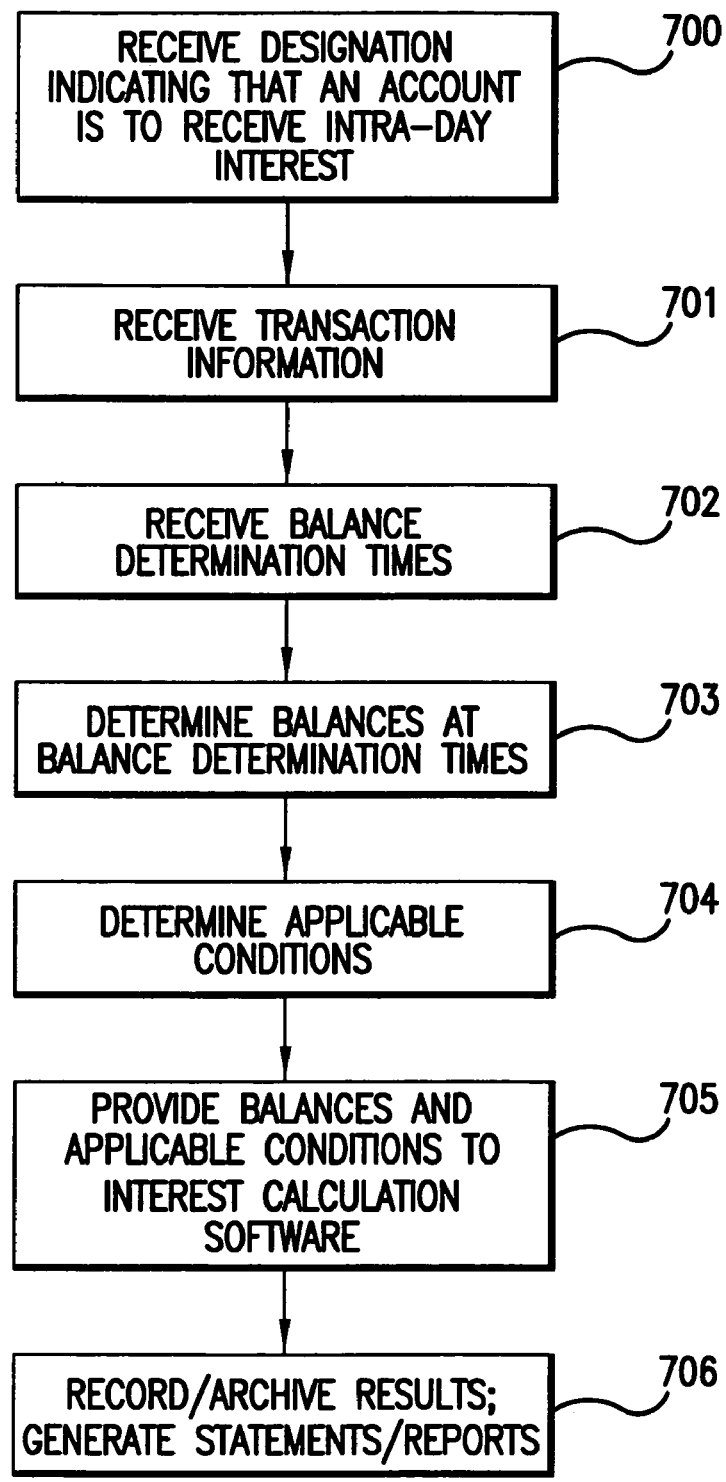
FIG. 7 shows a process flow according to embodiments of the invention.
Figure 8:
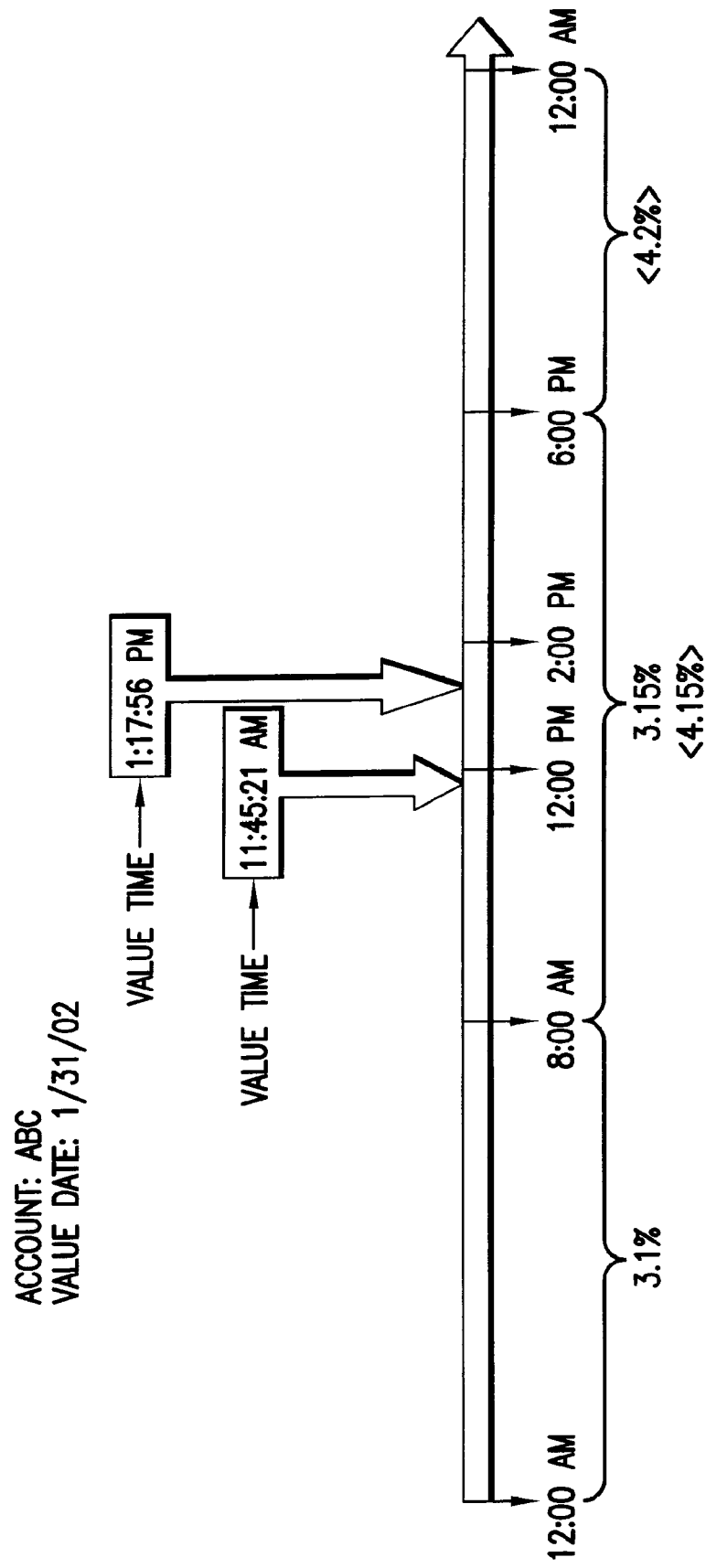
FIG. 8 illustrates an example of a time-line illustrating operations according to embodiments of the invention.

FIG. 7 shows a process flow of operations according to embodiments of the invention. The operations may be performed by the intra-day interest account management software 100 in accordance, for example, with inputs entered via a GUI 200 of the intra-day interest account management software 100. The operations will be discussed with reference to FIG. 8 as an illustrative example. FIG. 8 shows a timeline for a 24-hour period for an account ABC that is to receive intra-day interest calculation according to embodiments of the invention. Assume that at the beginning of the 24-hour period, account ABC has a positive balance of 1,043,877.88 currency units.

Referring now to FIG. 7, the operations may include receiving a designation indicating that an account, such as account ABC, is to receive intra-day interest calculation; block 700. The designation could be, for example, some kind of software "flag." Generally, an existing account could be modified by designating it to receive intra-day interest calculation, or a new account could be created and designated from the outset to receive intra-day interest calculation.

As shown in block 701, the operations may further include receiving additional transaction information, such as a payment item, a payment order, a value date and a value time. In the example of FIG. 8, a value date of Jan. 31, 2002 and two different value times are shown. A first value time is 11:45:21 AM, and a second value time is 1:17:56 PM. Assume that the transaction at value time 11:45:21 AM is a payment item of −2,000,000.00 currency units (a debit). Assume that the transaction at value time 1:17:56 M is a payment item of +700,000.00 currency units (a credit). According to embodiments of the invention, depending on the balance determination times, if a deposit or withdrawal is initially made between hour boundaries, the value time assigned may be moved up to the upper boundary. Thus, for example, the deposit or withdrawal made at 11:45:21 AM as shown in FIG. 8 could be assigned a value time of 12:00 PM. Similarly, a deposit or withdrawal made at 1:17:56 PM could be assigned a value time of 2:00 PM.

As shown in block 702 of FIG. 7, the operations may further include receiving intra-day balance determination times. For example, via the user interface, a user could specify a code identifying a corresponding balance time type as described above. Assume that in the example of FIG. 8, the balance determination times are set to be hourly.

Referring again now to FIG. 7, block 703, the operations may further include determining the balances for the account for the specified balance determination times. As noted earlier, whether a given transaction (e.g., payment item) is included in the net account balance at a given balance determination time may depend on the value date and value time of the transaction. For example, in FIG. 8, the balance determined for 11:00 AM would not include the 11:45:21 AM transaction, while the balance determined for 12:00 PM (noon) would reflect the 11:45:21 AM transaction, but not the 1:17:56 PM transaction. Similarly, the balances determined for 2:00 PM, 3:00 PM, 4:00 PM, and so on, would reflect both the 11:45:21 AM and 1:17:56 PM transactions.

Referring again now to FIG. 7, block 704, the operations may further include determining the applicable conditions for the intra-day interest calculation. This could involve referring to an interest day calendar as shown in FIG. 5, and to a set of conditions as shown in FIG. 6, to determine the interest day type of the particular value date concerned and the applicable interest rates for the relevant time periods. Assume, in the example of FIG. 8, that the applicable interest rates are as shown, i.e.: 3.1% between 12:00 AM (midnight) and 8:00 AM for credit balances, 3.15% between 8:00 AM and 6:00 PM for credit balances and 4.15% between 8:00 AM and 6:00 PM for debit balances, and 4.2% between 6:00 PM and midnight for debit balances.

Figure 9:
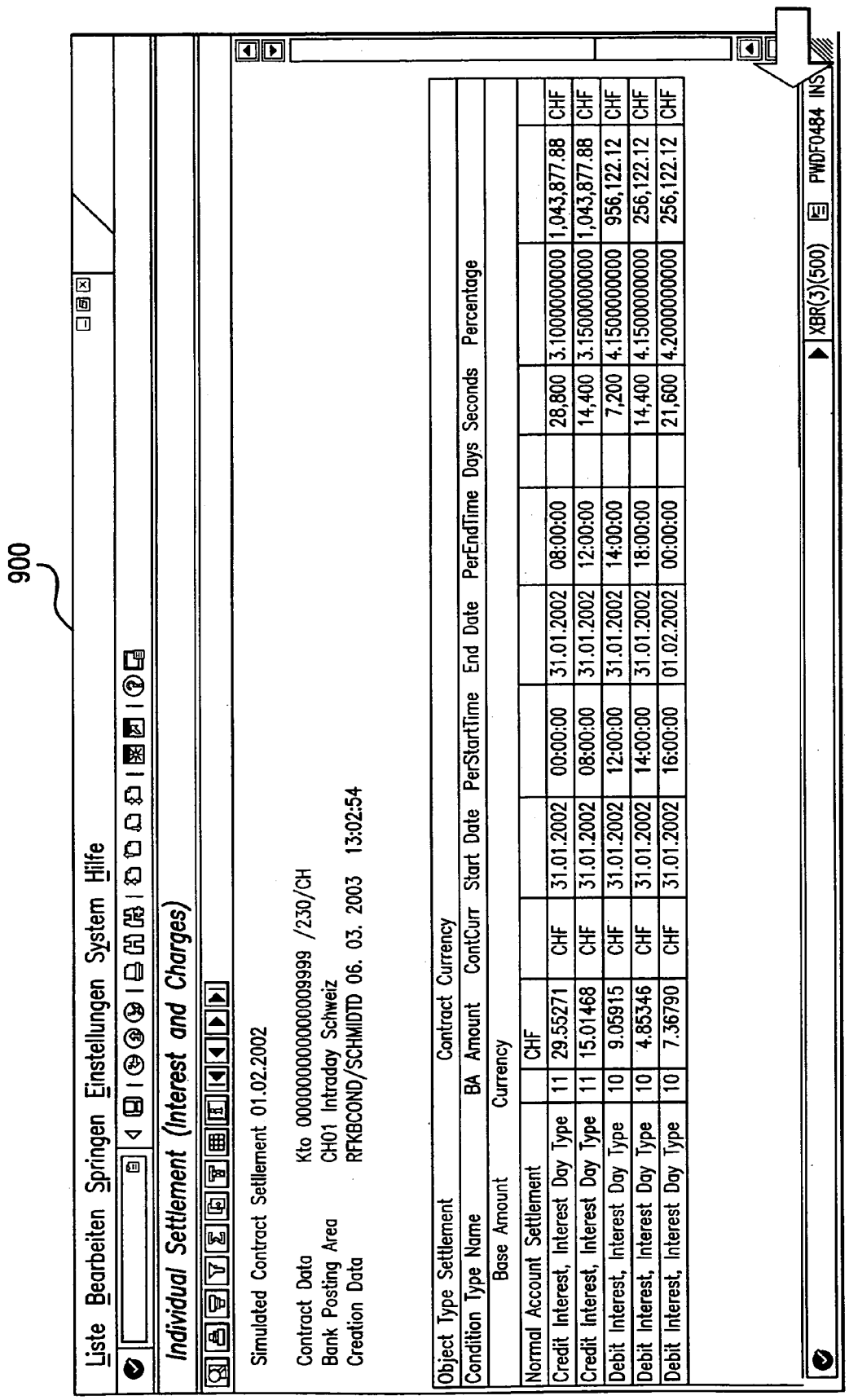
FIG. 9 shows an example of results of interest calculations according to embodiments of the invention.

As shown in block 705 of FIG. 7, the balances determined at the balance determination times and the applicable conditions may be provided to interest calculation software 104, which may include financial mathematics software to perform an intra-day interest calculation. The financial mathematics software may calculate an interest amount based on the account balance at each of the balance determination times, using the appropriate rate of interest, and return results to the intra-day interest account management software 100. The results of the calculations may cause an interest charge or accrual to be posted to an account and may be recorded, archived and reported on statements; block 706. For example, the results could be reported in terms of a beginning balance for an account, account deposits and withdrawals during a settlement period, applicable interest rates per time of day, intra-day balance determination times and associated interest accruals or charges, and so on. FIG. 9 shows an example of a report that could be generated according to embodiments of the invention, where the beginning account balance, transactions, balance determination times and conditions as described above with reference to FIG. 8 and account ABC have been provided to financial mathematics software to produce the results shown.

Figure 10:
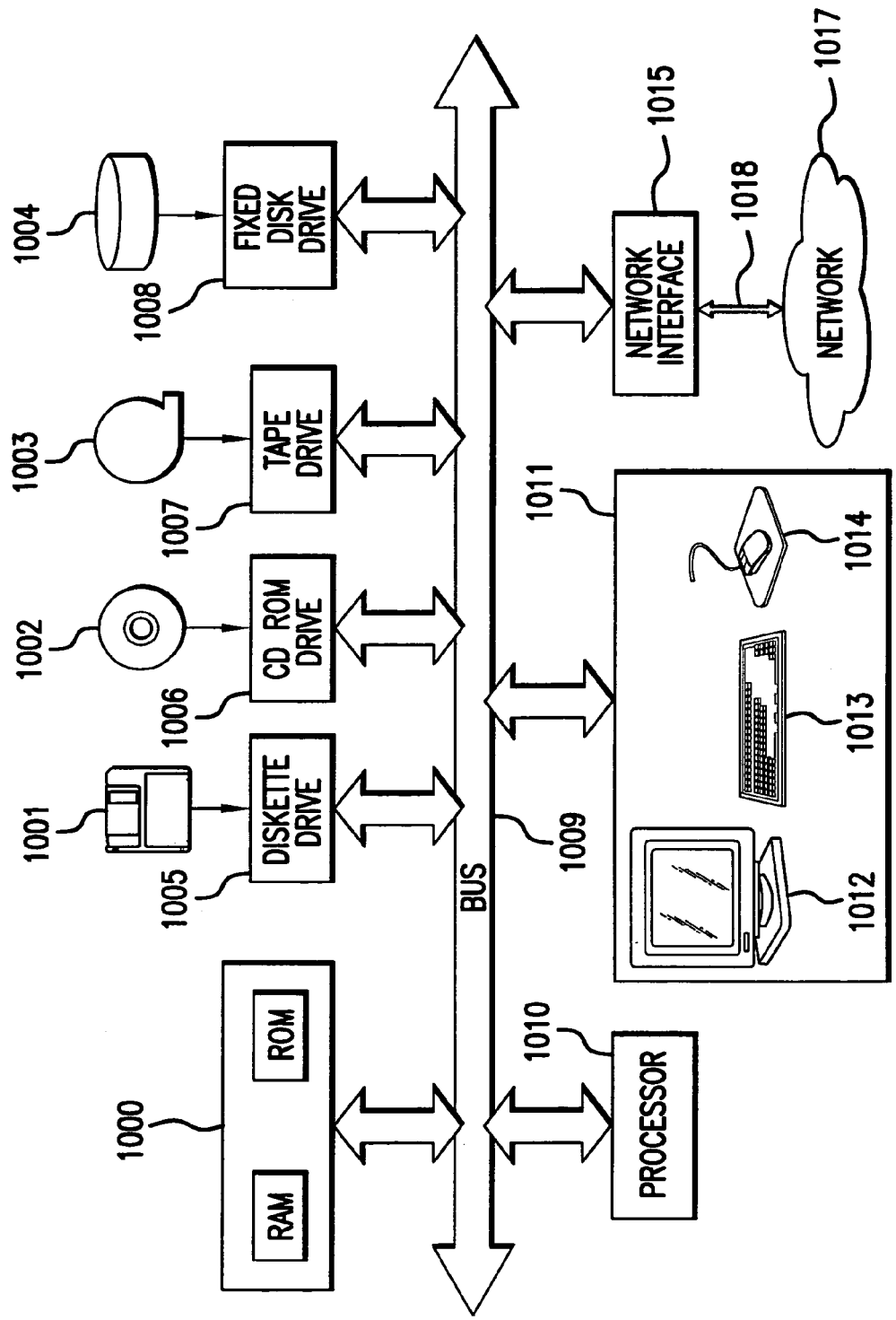
FIG. 10 shows an example of a system for implementing embodiments of the invention.

FIG. 10 shows a high-level representation of a computer system for implementing embodiments of the present invention, such as might be realized by a variety of known and commercially available hardware and software elements. The system comprises a memory 1000 including ROM and RAM, processor 1010 and user interface 1011 comprising a video display 1012, keyboard 1013 and mouse 1014. Elements may communicate via system bus 1006. The system may further comprise a network 1017 connected by a network medium 1018 and network interface 1015.

A computer program or collection of programs comprising computer-executable instructions for performing a method according to embodiments of the present invention may be stored and transported on computer-usable media such as diskette 1001, CD-ROM 1002, magnetic tape 1003 and fixed disk 1004. To perform the embodiments, computer instructions may be retrieved from the computer-usable media 1001-1004 using their respective drives 1005-1008 into memory 1000, and executed by a processor 1010. The functionality disclosed hereinabove for performing the embodiments may find specific implementations in a variety of forms, which are considered to be within the abilities of a programmer of ordinary skill in the art after having reviewed the specification.

Several embodiments of the present invention are specifically illustrated and/or described herein. However, it will be appreciated that modifications and variations of the present invention are covered by the above teachings and within the purview of the appended claims without departing from the spirit and intended scope of the invention.

What is claimed is:

1. A method for managing intra-day interest calculations for a bank account in an intra-day interest account management system, comprising:
   (a) in response to fluctuations in an account balance of the bank account, setting, by the intra-day interest account management system, balance determination times for the account, the balance determination times corresponding to a plurality of points in time within the span of a single day at which respective net account balances are to be used in an interest calculation for the account, wherein the balance determination times define intervals measured in at least one of seconds, minutes, or hours;
   (b) determining the balances for the account for the balance determination times, the determining including only transactions occurring prior to a specific balance determination time within the span of a single day;
   (c) determining applicable conditions for the interest calculation, the conditions relating to an interest rate to be applied based on an interest day type code assigned to the single day, the interest day type code associated with respective different interest rates at which respective net account balances are to be used in the interest calculation for the account, wherein a different interest rate is applied in the interest calculation for at least one of the balance determination times within the single day;
   (d) providing the account balances and applicable conditions to interest calculation logic in the intra-day interest account management system; and
   (e) recording a result of operations by the interest calculation logic in the intra-day interest account management system; and
   (f) presenting on a display device a graphical user interface having user-modifiable data fields providing a mapping of different interest rates to various interest day type codes, wherein the mapping of the different interest rates to each of the various interest day type codes is dependent upon conditions entered in the data fields related to the each of the different interest rates, and the conditions are modified according to user input.

2. The method of claim 1, further comprising assigning a value time to a transaction to the account, the value time corresponding to a time when the transaction is included in a balance determination.

3. The method of claim 2, wherein the value time is specified with an accuracy to the second.

4. The method of claim 1, wherein based on the conditions, an interest rate used in performing the interest calculation may change from a first time interval to a second time interval.

5. A method for managing intra-day interest calculations for a bank account, comprising:

(a) receiving a designation of a bank account to receive intra-day interest calculation;

(b) receiving transaction information for the account, the transaction information including a value time specifying when a transaction is to be taken into account for interest calculation;

(c) receiving a specification of a plurality of points in time for determining corresponding account balances for use in calculating an interest on the bank account, wherein the points of time correspond to a plurality of times within a single day and are determined by an intra-day interest account management system in response to intra-day fluctuations in an account balance of the bank account, wherein the points of time define intervals measured in at least one of seconds, minutes, or hours;

(d) for each of the points in time, determining a corresponding account balance, the account balance at a given point in time at least partly depending on the value time;

(e) for each of the points in time, determining an applicable interest rate based on an interest day type code associated with respective different interest rates assigned to the single day at which respective net account balances are to be used in the interest calculation for the account, wherein a different interest rate is applied in the interest calculation for at least one of the balance determination times within the single day;

(f) providing the account balances and the applicable interest rates to interest calculation logic; and (g) generating a record of interest amounts calculated by the interest calculation logic; and (h) presenting on a display device a graphical user interface having user-modifiable data fields providing a mapping of different interest rates to various interest day type codes, wherein the mapping of the different interest rates to each of the various interest day type codes is dependent upon conditions entered in the data fields related to the each of the different interest rates, and the conditions are modified according to user input.

6. The method of claim 5, wherein (e) comprises referring to an interest calendar that classifies days according to differing interest day types, each type having an interest rate associated therewith.

7. A system comprising:

a memory including computer-executable instructions;

a processor coupled to the memory to execute the instructions, the instructions comprising:

in response to fluctuations in an account balance of a bank account, setting, by an intra-day interest account management system, points of time corresponding to a plurality of times within a single day, wherein the points of time define intervals measured in at least one of seconds, minutes, or hours;

the intra-day interest account management software configured to receive information relating to an intra-day interest calculation, the intra-day interest calculation relating to a calculation of interest on an account for the points of time corresponding to a plurality of times within a single day set by the intra-day interest account management system, the information including:

transaction information including a value time relating to when a transaction to the account is included in the account balance for interest calculation; and conditions applicable to the interest calculation, the conditions relating to interest rates to be applied based on an interest day type code associated with respective different interest rates assigned to the single day at which respective net account balances are to be used in the interest calculation for the account, wherein a different interest rate is applied in the interest calculation for at least one of the balance determination times within the single day; and a display device presenting a graphical user interface having user-modifiable data fields providing a mapping of different interest rates to various interest day type codes, wherein the mapping of the different interest rates to each of the various interest day type codes is dependent upon conditions entered in the data fields related to the each of the different interest rates, and the conditions are modified according to user input.

8. The system of claim 7, wherein the intra-day interest account management software is configured to implement a user interface providing for entry of the information.

9. The system of claim 7, wherein the intra-day interest account management software comprises an interest calendar, the interest calendar classifying days according to differing interest day types, each type having an interest rate associated therewith.

10. A system comprising:

a memory including computer-executable instructions;

a processor coupled to the memory to execute the instructions, the instructions when executed implementing a process for managing intra-day interest calculation for a bank account, the instructions comprising:

(a) in response to fluctuations in an account balance of the bank account, setting, by an intra-day interest account management system, balance determination times for the account, the balance determination times corresponding to a plurality of points in time within the span of a single day at which respective net account balances are to be used in an interest calculation for the account, wherein the points in time define intervals measured in at least one of seconds, minutes, or hours;

(b) determining the balances for the account for the balance determination times;

(c) determining applicable conditions for the interest calculation, the conditions relating to an interest rate to be applied based on an interest day type code associated with respective different interest rates assigned to the single day at which respective net account balances are to be used in the interest calculation for the account, wherein a different interest rate is applied in the interest calculation for at least one of the balance determination times within the single day;

(d) providing the account balances and applicable conditions to interest calculation logic; and (e) recording a result of operations by the interest calculation logic; and (f) a display device presenting a graphical user interface having user-modifiable data fields providing a mapping of different interest rates to various interest day type codes, wherein the mapping of the different interest rates to each of the various interest day type codes is dependent upon conditions entered in the data fields related to the each of the different interest rates, and the conditions are modified according to user input.

11. The system of claim 10, the process further comprising assigning a value time to a transaction to the account, the value time corresponding to a time when the transaction is included in a balance determination, wherein the value time is specified with an accuracy to the second.

12. A machine-readable medium storing computer-executable instructions for performing a method for managing intra-day interest calculation for a bank account, the method comprising:
  (a) in response to fluctuations in an account balance of the bank account, setting, by an intra-day interest account management system, setting balance determination times for the account, the balance determination times corresponding to a plurality of points in time within the span of a single day at which respective net account balances are to be used in an interest calculation for the account;
  (b) determining the balances for the account for the balance determination times;
  (c) determining applicable conditions for the interest calculation, the conditions relating to an interest rate to be applied based on an interest day type code associated with respective different interest rates assigned to the single day at which respective net account balances are to be used in the interest calculation for the account, wherein a different interest rate is applied in the interest calculation for at least one of the balance determination times within the single day, wherein the balance determination times define intervals measured in at least one of seconds, minutes, or hours;
  (d) providing the account balances and applicable conditions to interest calculation logic; and
  (e) recording a result of operations by the interest calculation logic; and
  (f) presenting on a display device a graphical user interface having user-modifiable data fields providing a mapping of different interest rates to various interest day type codes, wherein the mapping of the different interest rates to each of the various interest day type codes is dependent upon conditions entered in the data fields related to the each of the different interest rates, and the conditions are modified according to user input.

13. A machine-readable medium storing computer-executable instructions for performing a method for managing intra-day interest calculation for a bank account, the method comprising:
  (a) receiving a designation of a bank account to receive intra-day interest calculation;
  (b) receiving transaction information for the account, the transaction information including a value time specifying when a transaction is to be taken into account for interest calculation;
  (c) receiving a specification of a plurality of points in time for determining corresponding account balances for use in calculating an interest on the bank account, wherein the points of time correspond to a plurality of times within a single day and are determined by an intra-day interest account management system in response to fluctuations in an account balance of the bank account, wherein the points of time define intervals measured in at least one of seconds, minutes, or hours;
  (d) for each of the points in time, determining a corresponding account balance, the account balance at a given point in time at least partly depending on the value time;
  (e) for each of the points in time, determining an applicable interest rate based on an interest day type code associated with respective different interest rates assigned to the single day at which respective net account balances are to be used in the interest calculation for the account, wherein a different interest rate is applied in the interest calculation for at least one of the balance determination times within the single day;
  (f) providing the account balances and the applicable interest rates to interest calculation logic; and
  (g) generating a record of interest amounts calculated by the interest calculation logic; and
  (h) presenting on a display device a graphical user interface having user-modifiable data fields providing a mapping of different interest rates to various interest day type codes, wherein the mapping of the different interest rates to each of the various interest day type codes is dependent upon conditions entered in the data fields related to the each of the different interest rates, and the conditions are modified according to user input.

* * * * *